United States Patent
Ishkov et al.

(10) Patent No.: US 12,098,323 B2
(45) Date of Patent: Sep. 24, 2024

(54) METHOD OF ARTIFICIALLY REDUCING POROSITY

(71) Applicant: Heriot-Watt University, Edinburgh (GB)

(72) Inventors: Oleg Ishkov, Edinburgh (GB); Mohamed Arab, Edinburgh (GB)

(73) Assignee: Heriot-Watt University, Edinburgh (GB)

(*) Notice: Subject to any disclaimer, the term of this patent is extended or adjusted under 35 U.S.C. 154(b) by 0 days.

(21) Appl. No.: 17/916,557

(22) PCT Filed: Apr. 1, 2021

(86) PCT No.: PCT/GB2021/050824
§ 371 (c)(1),
(2) Date: Sep. 30, 2022

(87) PCT Pub. No.: WO2021/198700
PCT Pub. Date: Oct. 7, 2021

(65) Prior Publication Data
US 2023/0174842 A1    Jun. 8, 2023

(30) Foreign Application Priority Data
Apr. 1, 2020 (GB) .................................... 2004837

(51) Int. Cl.
*C09K 8/42* (2006.01)
*C09K 8/504* (2006.01)

(52) U.S. Cl.
CPC ............. *C09K 8/426* (2013.01); *C09K 8/424* (2013.01); *C09K 8/5045* (2013.01)

(58) Field of Classification Search
None
See application file for complete search history.

(56) References Cited

U.S. PATENT DOCUMENTS 5,244,043 A * 9/1993 Shuler .................... E21B 43/12
166/292
6,148,913 A * 11/2000 Collins .................. C09K 8/528
166/263

(Continued)

FOREIGN PATENT DOCUMENTS

GB    2 545 344    6/2017
GB    2 570 637    8/2019

(Continued)

OTHER PUBLICATIONS

Foreign Search Report for GB Appl. Ser. No. GB2004837.7 dated Oct. 13, 2020 (1 page).

(Continued)

*Primary Examiner* — Andrew Sue-Ako
(74) *Attorney, Agent, or Firm* — FOLEY & LARDNER LLP (57) ABSTRACT

The present invention relates to artificially reducing the porosity of any potential flow paths in the near-wellbore region of a well or in permeable zones within or surrounding a well. In doing so, the permeability in this the targeted region will be significantly reduced, thus, preventing unwanted flow of subsurface fluids. The present invention concerns a method comprising applying a first and second solution comprising scale precursors to the porous media, wherein following this application, at least a portion of the scale precursors form at least two insoluble salts. Additionally, the present invention concerns a kit of parts comprising the first and second solutions.

26 Claims, 8 Drawing Sheets

(56) References Cited

U.S. PATENT DOCUMENTS

2003/0073586 A1* 4/2003 Crossman ............. C08F 220/06
                                                      252/180
2017/0313927 A1* 11/2017 Mason ................... C09K 8/528
2020/0148935 A1* 5/2020 Collins ................. C04B 11/005

FOREIGN PATENT DOCUMENTS

| WO | WO-2007/064213 A1 | 6/2007  |
| WO | WO-2017/098256 A1 | 6/2017  |
| WO | WO-2018/220408 A1 | 12/2018 |
| WO | WO-2019/086864 A1 | 5/2019  |

OTHER PUBLICATIONS

International Search Report and Written Opinion on PCT Appl. Ser. No. Ser. No. PCT/GB2021/050824 dated Sep. 7, 2021 (13 pages).

* cited by examiner

Figure 1: Table 1

| Precursor | Solvent | Solubility g/L | ICP Avg $Ba^{2+}$ g/L | ICP Avg $Ba^{2+}$ mol/L | Literature mol/L | Diff |
|---|---|---|---|---|---|---|
| $Ba(C_2H_3O_2)_2$ | Water | 509 | 274 | 2.0 | 2.2 | -0.2 |
| | 15% v/v MEG | 565 | 304 | 2.2 | - | |
| $BaI_2.2H_2O$ | Water | 1595 | 513 | 3.7 | 4.6 | -0.8 |
| | 15% v/v MEG | 1671 | 537 | 3.9 | - | |

Figure 2: Table 2

| Precursor | Solvent | Solubility g/L | ICP Avg $SO_4^{2-}$ g/L | ICP Avg $SO_4^{2-}$ mol/L | Literature mol/L | Diff |
|---|---|---|---|---|---|---|
| $CuSO_4.5H_2O$ | Water | 299 | 115 | 1.2 | 1.0 | 0.2 |
| | 15% v/v MEG | 202 | 78 | 0.8 | 1.2 | -0.4 |
| $MnSO_4.H_2O$ | Water | 650 | 369 | 3.8 | 3.7 | 0.2 |
| | 15% v/v MEG | 530 | 301 | 3.1 | - | |

Figure 3: Table 3:

| Case # | Precursors | $Ba^{2+}$ mol/L | $SO_4^{2-}$ mol/L | $BaSO_4$ | | |
|---|---|---|---|---|---|---|
| | | | | mol/L | g/l | % v/v * |
| 1 | $BaI_2.2H_2O$ | 3.7 | | 1.2 | 280 | 6.2% |
| | $CuSO_4.5H_2O$ | | 1.2 | | | |
| 2 | $BaI_2.2H_2O$ | 3.7 | | 3.7 | 871 | 19.4% |
| | $MnSO_4.H_2O$ | | 3.8 | | | |
| 3 | $Ba(C_2H_3O_2)_2$ | 2.0 | | 1.2 | 280 | 6.2% |
| | $CuSO_4.5H_2O$ | | 1.2 | | | |
| 4 | $Ba(C_2H_3O_2)_2$ | 2.0 | | 2.0 | 465 | 10.4% |
| | $MnSO_4.H_2O$ | | 3.8 | | | |

* Assuming 4.49 g/cm3 density at RT

| Case # | Precursors | $Cu^{2+}$ mol/L | $I^-$ mol/L | CuI | | |
|---|---|---|---|---|---|---|
| | | | | mol/L | g/l | % v/v ** |
| 5 | $BaI_2.2H_2O$ | | 7.5 | 1.2 | 228 | 4% |
| | $CuSO_4.5H_2O$ | 1.2 | | | | |

** Assuming 5.67 g/cm3 density at RT

| Case # | Precursors | $I^-$ mol/L | $I_2$ | | |
|---|---|---|---|---|---|
| | | | mol/L | g/l | % v/v *** |
| 6 | $BaI_2.2H_2O$ | 7.5 | 3.7 | 947 | 19% |
| 7 | Minus CuI(s) #5 | 6.3 | 3.1 | 796 | 16% |

*** Assuming 4.933 g/cm3 density at RT

METHOD OF ARTIFICIALLY REDUCING POROSITY

CROSS-REFERENCE TO RELATED APPLICATIONS

This application is U.S. National Phase Application of the International Application PCT/GB2021/050824, filed Apr. 1, 2021 which claims priority under 35 U.S.C. 119 to GB2004837.7, filed Apr. 1, 2020, which is incorporated by reference in its entirety.

FIELD OF THE INVENTION

The invention relates to artificially reducing the porosity of any potential flow paths in the near-wellbore region of a well or in permeable zones within or surrounding a well. In doing so, the permeability in the targeted region will be significantly reduced, thus, preventing unwanted flow of subsurface fluids.

BACKGROUND OF THE INVENTION

A well is drilled to establish communication between the surface and the subsurface rock. In oil and gas applications, this may allow the flow of injection fluids from the wellhead at surface to the reservoir, or the flow of hydrocarbons from a reservoir to the wellhead at the surface, and from that point onwards to processing facilities.

The wellbore of an oil and gas well is surrounded by a rock formation comprising various features including porous media, throats, fissures, cracks or other voids. The reservoir fluids flow within these rock features prior to their inflow into the well.

When a well reaches the end of its lifetime (e.g. typically when the cost of operating the well exceeds the value of the produced hydrocarbons or due to integrity issues), or for some other temporary reasons, the well must be suspended and later may be decommissioned. The goal of these activities is achieving a disconnection or isolation, which would prevent undesired flow from the rock formation to the wellbore and up to the surface.

Currently, a key aspect of isolating the reservoir involves setting a barrier into the wellbore. This is typically a combination of a mechanical plug used to suspend the well, and a cement plug used for long term isolation between the wellbore (and other permeable zones) and the surface. Additionally, the suspension/decommission process may include milling out the metal casing of the well to further expose the surface of the rock and improve the cement bond with the formation. A key limitation of this method is the inability of the current approach to reduce the potential inflow rate from the reservoir into the well; the focus is on limiting the outflow from the well to the surface. This is because cement particles are not able to penetrate features in the rock formation through which reservoir fluids flow.

The effect of this inability to reduce the potential inflow rate from the reservoir to the well is that the cement plug may fail over time. The bottomhole pressure may cause the cement to develop cracks over prolonged periods, which may become hydrocarbon leak paths (e.g. methane) or other fluids (e.g. $CO_2$ and $H_2S$). Furthermore, the well integrity (both cement and any tubing/casing) may be compromised through exposure to damaging fluids (e.g. $H_2S$ and $CO_2$). For example, carbon dioxide gas ($CO_2$) naturally present or injected may produce carbonic acid ($H_2CO_3$) by a reaction with subsurface water. Carbonic acid may react with minerals in some cements (e.g. Portlandite) and cause deterioration of a plug and lead to undesired flow of subsurface fluids, which in turn can promote corrosion of tubings so wellbore integrity may be compromised. This is especially crucial for sour reservoirs, high temperature high pressure (HTHP) environments and carbon storage applications. In this respect, storage of carbon (e.g. in the form of $CO_2$) in abandoned reservoirs may pose significant well integrity issues due to the potential failure of the cement plugs.

Other methods of well disconnection from the reservoir include that as taught by WO2017098256, which discloses a method of abandoning a well by forming a mineral scale precipitate using two aqueous solutions that each comprise a scale precursor which on mixing results in the formation of one insoluble salt, and where one or both solutions comprise a scale inhibitor. The scale inhibitor is a chemical that prevents or slows down the formation of insoluble precipitate mineral.

WO2017098256 discloses both a system wherein the solutions are mixed on the surface and pumped into the well (in which case the scale inhibitor is necessary to prevent scaling outwith the porous media, i.e. prior to placement), or where one fluid is pumped down the tubing and the other down the annular space between the tubing and the casing, so they mix just prior to entering the wellbore.

The scale inhibitor is removed from the solution by adsorption onto the rock, leaving the mixed solution uninhibited and permitting scale formation of one insoluble salt. This delayed activity permits the solutions to permeate the rock at more distant locations before precipitation.

Other than the method described by WO2017098256, the following methods are also available for disconnecting the inflow from the reservoir into the well.

These are:

GB 191210478 covers a method reducing permeability of soils by injecting solutions of salts of alkaline-earth, earthy or heavy metals, and solutions of hydrates, aluminates, carbonates, or silicates.

U.S. Pat. No. 5,244,043 presents a method of using scaling brine with scale inhibitor to delay precipitation.

U.S. Pat. No. 3,244,230 teaches a method of using an aqueous solution of sodium silicate and urea.

U.S. Pat. No. 3,730,272A teaches a method of controlled precipitation by a reaction of nitrite ions and urea.

U.S. Pat. No. 3,747,677A teaches a method of precipitating metal hydroxide with a reactant that raises pH to cause precipitation. The process is controlled by dissolving in the aqueous solution a mixture of halide ions and an epoxide.

U.S. Pat. No. 2,238,930 teaches a method to produce a precipitate by reacting a water soluble metal salt with an alkaline material. The process is delayed by controlling pH level.

US 2,003,121,662 teaches a method of using thermosetting resin that has to be pumped into the wellbore, then curing in situ. Method requires prior significant cooling of the wellbore before the application.

WO 2018/055382 teaches a method of sealing a well using a swellable, which may comprise polymer.

U.S. Pat. No. 5,512,096 teaches a method of using a composition containing sodium bentonite and cement to seal boreholes.

RU 218694002 discloses the use of aqueous solution of sodium sulphate and calcium chloride to precipitate calcium sulphate.

WO 0031209A1 teaches a method of controlling precipitation of inorganic salts in porous media by alternating injection and creating pulsations. The precipitating mineral is a salt of calcium, preferably octacalcium phosphate.

U.S. Pat. No. 3,592,267 teaches a method of using aqueous solution of an alkali metal silicate dispersed in liquid hydrocarbon, followed by the injection of a solution of an alkaline earth metal salt. Method claims to precipitate silicate salts.

WO 9804649A1 teaches a method of using calcium salt (preferred calcium acetate) and then applying an aqueous silicate solution (sodium silicate).

US 2015/0361759 discloses a method of reducing permeability of a well by detonating one or more explosive charges. The well is then filled in the region of the exposed surrounding formation with a sealing material to form one or more plugs within the well to seal the well.

Prior arts that teach use of resins, plastics, polyacrylates, and other non-mineral materials can be useful to solve some of the problems, however the long-term stability under subsurface conditions is not well researched. Approaches that use cement, resins, or bismuth-containing alloys form a seal within the tubing of the well and are not able to penetrate the formation to isolate flow from a reservoir to the wellbore.

Moreover, despite the fact that some techniques are promising and could potentially be successful in some applications, most of them require additional hardware, and associated costs.

There is therefore a need for effective subsurface isolation methods for managing and mitigating leaks from permeable zones/paths linked to wells.

SUMMARY OF THE INVENTION

The present invention provides a method of reducing the porosity of any potential flow paths in the near-wellbore region of an oil, gas or water well (e.g. interconnected pores, pore throats, fissures, cracks, or other voids in general) in order to reduce or prevent the egress of fluids from the porous medium of the near-wellbore and their inflow into the well. This is achieved by embedding a material in the form of two or more insoluble mineral salts within the aforementioned features of the porous medium. This may be used with either or both of the traditional mechanical plug or the cement plug, where the insoluble salts are juxtaposed with the mechanical and/or cement plug and the porous media. The present invention also applies to any permeable zones/paths with potential for flow within or in the vicinity of a well, and all the descriptions to flow are applicable to this general objective.

In well suspension applications, damaging the inflow potential of a well to a level at which the well would no longer be able to flow naturally (i.e. sub-hydrostatic) would make suspending the well safely possible without the need to set a mechanical plug. In doing so, well suspension operations may be made shorter (by only needing to inject fluids) and safer (by reducing the scope of intervening the well), thereby leading to cost saving opportunities.

Furthermore, in cases where permanent abandonment requires milling out the metal casing of the well to further expose the surface of the rock and improve the cement bond with the formation, being able to perform in-pore isolation may reduce the scope of milling operations. This would have the benefit of potential cost savings as well as limiting the production of large quantities of metal debris, which can damage subsea safety valves, topside facilities and more importantly safety critical equipment like blowout preventers. This is additionally applicable to other workover or well intervention applications which require milling/drilling.

In applications relating to the wellbore, accordingly, a first aspect of the present invention provides a method of reducing the porosity (and subsequently, the permeability) of the porous media of the near-wellbore wherein the method comprises:

(a) Applying a first solution comprising a first and second scale precursor in the form of soluble ions to the porous media, and;

(b) Applying a second solution comprising a third and fourth scale precursor in the form of soluble ions to the porous media;

Wherein following steps (a) and (b), at least a portion of the scale precursors form at least two insoluble salts.

By applying the first and second solutions to the porous media, the two solutions come in contact and a mixing front/zone develops enabling the commingling of the scale precursors from the first and second solutions to form the insoluble salts; i.e.:

If the first solution has Precursor A (cation) and Precursor C (anion), and;

If the second solution has Precursor B (cation) and Precursor D (anion);

Precursor A combines with Precursor D to form insoluble salt AD, and

Precursor C combines with Precursor B to form insoluble salt BC.

The co-precipitation of at least two insoluble salts leads to a substantial drop in porosity in the porous media, thereby achieving the objective of the method.

In a first embodiment, the first and the second solutions can be applied to the near-wellbore consecutively by pumping the first and the second solutions separately, one after the other, through the same flowlines/paths and into the wellbore.

In a second embodiment, the first and second solutions can be applied to the near-wellbore concurrently through different flow paths. For example, the first solution fluid is pumped down the tubing and the second solution fluid is pumped down the annular space between the tubing and the casing, so they mix just prior to entering the wellbore.

In a third embodiment, the first solution can be applied first to the formation by pumping down the tubing, and the second solution is prepared in situ using an acidic brine solution in combination with solids (e.g. rock, proppants) present in the wellbore. This ensures that the two insoluble salts only precipitate at the site of the near-wellbore feature. The method may further comprise the application of a proppant prior to the addition of the second solution. Proppant may be selected from a group comprising common commercially available hydraulic fracturing or gravel pack proppants that are based on calcite grains.

In embodiments where the first and second solutions are applied consecutively down the same tubing, the method can further comprise use of a spacer solution (i.e. a fluid unreactive to the first and the second solutions) or a spacer device (e.g. plugs used to separate mud and cement in annular cementation applications) to prevent contact between the first and second solutions prior to their application to the porous media. This avoids the risk of clogging the flow paths leading to the near-wellbore by the insoluble salts and thus removing access to the near-wellbore for subsequent applications.

The above is particularly important in cases in which access to the porous media is required until operations are complete, e.g. when porosity reduction requires multiple applications of the solutions containing the precursors. Moreover, it is very important in cases in which the intervention needs to be interrupted, e.g. due to equipment failure or unfavourable weather, wherein separating the solutions, the intervention can be paused safely without damaging the ability to perform the activity when the intervention can be resumed.

The method may further comprise repeating steps (a) and (b). In doing so, the method of the present invention would be applied iteratively, permitting a suitable plug to be formed over several applications of the first and second solutions. This allows for an increased reduction in the porosity (and subsequently, the permeability) of the porous media of the near-wellbore, isolating the well from the near-wellbore.

The method may further comprise use of a preceding pre-flush solution. Suitably, the pre-flush solution may comprise a commercially available amphiphile, a surfactant, or a combination thereof. Preferably, such amphiphiles may be selected from a group consisting of ethylene glycol monobutyl ether (EGMBE), diethylene glycol monohexyl ether (DGHE), ethylene glycol monohexyl ether (EGHE), diethylene glycol monobutyl ether acetate (DGBEA), ethylene glycol monobutyl ether acetate (EGBEA), N-Amyl alcohol or a combination thereof. A pre-flush application may help reduce the hydrocarbon saturation in the near-wellbore region by displacing it deeper into the formation. It may also be used to clean the surface of the rock to expose bonding sites for the insoluble scales.

One or both of the first and second solutions may be non-aqueous. Advantageously the pore-space within the porous media may be more readily accessed in cases where organic residue (e.g. residual hydrocarbon saturation) competes for pore-space occupation with an aqueous solution.

The first and second solutions (aqueous or organic) could be miscible, i.e. when mixed, agitated and allowed to settle, no separation into different portions (the formation of a fluid boundary) may be observed. This enables efficient development of a mixing zone at the point of placement, thereby ensuring the availability of the precursors for precipitation.

Solvents used to create an aqueous solution may comprise seawater, produced water, KCl brine or low salinity brine. Solvents used to create a non-aqueous solution may be amphiphiles of the glycol ether family such as ethylene glycol, ethylene glycol monobutyl ether and diethylene glycol monobutyl ether.

The spacer solution may be of the same miscibility as the first and second solutions. In some embodiments, the spacer solution is the same solvent mix as the first and second solution, absent the scale precursors. In other embodiments, the spacer solution is not miscible with the first solution, but the miscibility of the spacer solution with the first solution improves on mixing with the second solution. Preferably, such spacer solutions may be a non-aqueous such as a hydrocarbon, preferably diesel or crude oil, and when the solvent of the first solution is aqueous and the solvent of the second solution is a mix of aqueous and amphiphile solvents.

The first and second scale precursors may be selected from:
  Cations selected from a group comprising group 2 alkali earth metals, with $Ca^{2+}$, $Sr^{2+}$ and $Ba^{2+}$ generally preferred, or polyatomic cations, with $NH_4^+$ generally preferred, and;
  Anions selected from a group comprising the halides group, with, $F^-$, $Cl^-$, $Br^-$ or $I^-$ generally preferred, an oxide anion or a polyatomic anion, with $CH_3COO^-$, $CO_3^{2-}$ or a hydroxide anion generally preferred.

Suitably, the first solution may further comprise other cations and anions selected from those denoted above, other than the first and second scale precursors.

Advantageously, use of a halide results in a higher relative molecular weight, increasing the oleic solubility of the resulting salt, thereby enabling its dissolution in embodiments comprising the use of non-aqueous solutions.

The third and fourth scale precursors are different anions and/or cations from those of the first and second scale precursors, and may be selected from:
  Cations selected from a group comprising the transition metal group, preferably a cation selected from the $5^{th}$ period transition metal group, with $Mn^{2+}$ or $Cu^{2+}$ generally preferred.
  Polyatomic anions, with $SO_4^{2-}$ generally preferred.

Suitably, the first solution may further comprise other cations and anions selected from those denoted above, other than the third and fourth scale precursors.

It is noted that transition metal chemistry enables the formation of soluble salts with polyatomic ions under both, aqueous and non-aqueous conditions.

Without wishing to be bound by theory, it is also thought that use of a transition metal salt in the present invention, and especially where the transition metal salt comprises either or combination of both of $Cu^{2+}$ or $Mn^{2+}$ may advantageously slow the nucleation rate of the insoluble plug formed on contact between the first and second solutions. This would lead to different crystal growth characteristics, and most importantly, in relation to the size of particles making the insoluble plug. Advantageously, this would result in a more firmly seated insoluble salt in the near well bore feature.

At least one of the precursors may be a highly soluble ion (solubility >100 g/100 ml) when in their respective first or second solution. Preferably all of the precursors are highly soluble ions (solubility >100 g/100 ml) when in their respective first or second solution. This is advantageous when attempting to achieve the desired reduction of porosity in the porous media through a minimal application of the first and second solution.

The above chemistry of the first and second solutions are easy to prepare at the point of use due to the straightforward formation of the first and second solutions by the dissolution of the highly soluble (solubility >100 g/100 ml) scale precursors in the aqueous or organic solvents. This is considered to be "high loading", permitting the co-precipitation of a large amount of the two or more insoluble salts for a given amount of first and second solution. The scale precursors may be provided in the undissolved form to be mixed with solvent at point of use, e.g. in mixing tanks.

The amount of precipitation possible from one application of the first and second solutions may be about 1 kg of precipitate per litre (which translates to more than 20% v/v). Through the application of a sufficient amount (a function of near-wellbore interconnected pore volume) of the first and second solutions, a sufficient seal/plug (determined by a porosity reduction that results in no mobility of fluids) is formed in the near-wellbore (i.e. one which prevents the egress of gas and/or oil from within the well). The seal may extend beyond the near-wellbore and may disconnect the zones of the highest permeability feeding the near-wellbore pores. Suitably, the precipitation level may be sufficient to cover 15-30 cm (6-12 in) cylindrical depth around the wellbore. Suitably, the volume of first and second solutions may be defined by the concentration of the scale precursors and the pore volume of the near-wellbore.

In relation to the precipitates, the following is noted:

At least one of the resultant insoluble salts may be a group 2 metal sulphate. Preferably, this insoluble salt may be selected from a group comprising $BaSO_4$, $SrSO_4$ or $CaSO_4$.

At least one of the insoluble salts may be a transition metal salt of halide, oxide, hydroxide or as otherwise permitted by the chemistry of the selected precursors and the formation conditions. Preferably, this insoluble salt may be selected from a group comprising $CuI$, $CuI_2$, $Cu(OH)_2$, $CuBr_2$, $Cu(CH_3COO)_2$, $MnI_2$, $Mn(OH)_2$, $MnBr_2$, $Cu_2O$, $CuO$, $MnO$, $Mn_3O_4$, $Mn_2O_3$, $MnO_2$, $Cu_2CO_3(OH)_2$, $MnCO_3$.

Suitably, the in-situ seal/plug is stable in the sense of exhibiting low solubility in aqueous/non-aqueous solutions (solubility $<10^{-3}$ g/100 ml), preferably just below the saturation concentration, and high resistance to fluids creating aggressive downhole conditions such as $H_2S$ and $CO_2$ (no improvement in solubility of the precipitates by an order of magnitude). Without wishing to be bound by theory, it is believed that the seal/plug will have stability (i.e. imperceptible dissolution in formation fluids) over hundreds to thousands of years.

Density and viscosity differences between the first and second solutions could be tailored to promote specific mixing features under forced and natural convection conditions. Suitably, the density and viscosity differences may be tailored by dissolving density and viscosity modifiers in the first and second solutions. This enables effective placement of the mixing zones as well as continued precipitation reactions when flow is not artificially supported, e.g. the shut-in phase of a well suspension.

The first, second or spacer solution may further comprise viscosity modifiers, flow improvers, surfactants, emulsifiers, etc.

Any commercially available chemicals additives can be used for such purposes as long as they provide chemical compatibility with core precursors of the invention.

In a preferred embodiment of the present invention, the method comprises:

(1) Applying a pre-flush solution comprising 15% ethylene glycol monobutyl ether (EGMBE) in sulphate-free seawater to the porous media.

(2) Applying a first solution comprising barium iodide ($BaI_2$), barium acetate ($Ba(CH_3COO)_2$), 15% ethylene glycol (MEG) and sulphate-free seawater, to the porous media.

(3) Applying a spacer solution comprising sulphate-free seawater to the porous media.

(4) Applying a second solution comprising copper sulphate ($CuSO_4$), manganese sulphate ($MnSO_4$), 15% ethylene glycol MEG and seawater, to the porous media.

Repeating steps (2) to (4) as required until the egress of fluids from the porous medium of the near-wellbore and their inflow into the well is reduced or stopped.

In a second preferred embodiment, the method comprises:

(1) Applying a copper-rich brine to the porous media, with $CuSO_4$ generally preferred. The brine may further comprise a buffer to increase the basicity of this solution. Preferably, such chemicals buffers buffer to about >7 pH, and may be selected from a group comprising sodium hydroxide (NaOH), lime (CaO), hydrated lime $(Ca(OH)_2$ and other commercially available buffering agent analogues.

(2) Applying a calcium carbonate solid to the open hole/perforations in the porous media, either part of the way or all the way to the top perforations. This feature provides: a) the ability to prepare the scaling solutions right at the sand-face; and thus additional source of calcium ions; b) helps with placement of the precipitates.

(3) Applying Hydrofluoric acid to the porous media, preferably through coiled tubing, to fill the wellbore area exposed to the zone wherein a seal is required. Optionally, small concentrations of HCl may be used as additive to enhance the solubility of the proppants if used.

(4) Repeating steps (1) to (3) as required until the egress of fluids from the porous medium of the near-wellbore and their inflow into the well is reduced or stopped.

In the mixing of the HF solution from step 3 and the carbonate solids from step 2, the first solution as denoted by the general description of the invention is prepared in the wellbore (i.e. $Ca^{2+}$ cation, $CO_3^{2-}$ anion, $F^-$ anion).

The interaction between the second solution and the first solution prepared in the wellbore creates a shallow seal that impairs the ability of the well to flow. The seal is comprised of at least calcium fluoride, calcium sulphate, and basic copper carbonate, and further reinforced by precipitates from side reactions depending on reservoir mineralogy/chemistry. Key examples are potassium silicofluoride, hydrous silica and calcium fluoride hydrous aluminosilicate (the co-precipitation feature of the invention).

For all embodiments of the present invention, the near-wellbore can be sealed temporarily as part of well suspension or permanently as part of well abandonment.

In some embodiments, the present invention is applied as a method to reduce inflow to the well, thereby hindering the ability of the well to flow unassisted. Advantageously this may be used where avoiding a well blow out is desired.

The method may be used to reduce risks of cement plug integrity issues as a result of reservoir pressure re-charge or reactions between the cement plug and any fluids encountered in the subsurface. The method may be used to isolate permeable zones during drilling operations, e.g. when shallow gas is encountered. The method may be used to ensure annular isolation, i.e. no communication between subsurface fluids and fluids in the annulus of a well.

Given the above applications, the application of the first and second solutions to the porous media may be limited to only a portion of the porous media. This may be achieved by limiting the amount of precursors used, or by applying the solutions only to the desired interval length in the well via using coiled tubing or physical flow limiting devices e.g. plugs, packers.

In some embodiments, the porous media may be connected to an oil and/or gas well, in other embodiments the porous media may be connected to an injection well.

DEFINITIONS

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

As used herein, the articles "a" and "an" refer to one or to more than one (for example to at least one) of the grammatical object of the article.

"About" shall generally mean an acceptable degree of error for the quantity measured given the nature or precision of the measurements.

As used herein, "rock features" includes porous media, throats, fissures, cracks or other voids which are accessed by the subsurface well.

As used herein, "insoluble" is a solid with low solubility (<10-3 g/100 ml) and high stability in aqueous media.

An embodiment of the present invention will now be described by way of example only, with reference to the accompanying figures.

DETAILED DESCRIPTION OF THE INVENTION

Example 1: Preparation of Primary Solutions and Chemical Reactions

To prepare first solutions, the following solutions were created:
A solution of 15% monoethylene glycol (MEG) and varying concentrations of $BaI_2$ or $Ba(CH_3COO)_2$ in sulphate-free seawater:

$BaI_{2(s)} \rightarrow Ba^{2+}_{(aq)} + 2I^-_{(aq)}$ $Ba(CH_3COO)_{2(s)} \rightarrow Ba^{2+}_{(aq)} + 2(CH_3COO)^-_{(aq)}$ In performing the above solutions, a saturation index equal or less than one was maintained to achieve a stable solution.

To prepare second solutions, the following solutions were created:
A solution of 15% MEG and varying concentrations of $CuSO_4$ and $MnSO_4$ in sulphate-free seawater:

$CuSO_{4(s)} \rightarrow Cu^{2+}_{(aq)} + SO_{4(aq)}^{2-}$ $MnSO_{4(s)} \rightarrow Mn^{2+}_{(aq)} + SO_{4(aq)}^{2-}$ In performing the above solutions, a saturation index equal or less than one is maintained to achieve a stable solution.

Figure 1:
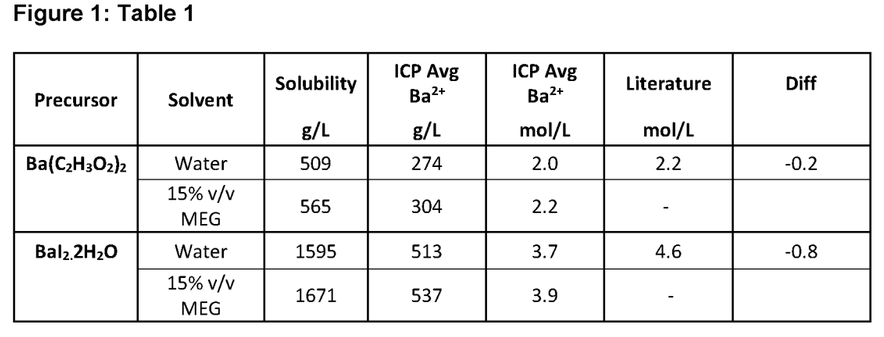
FIG. 1: Table 1: Experimentally observed solubilities for two of the first solution precursors compared with the results in the literature.
Figure 2:
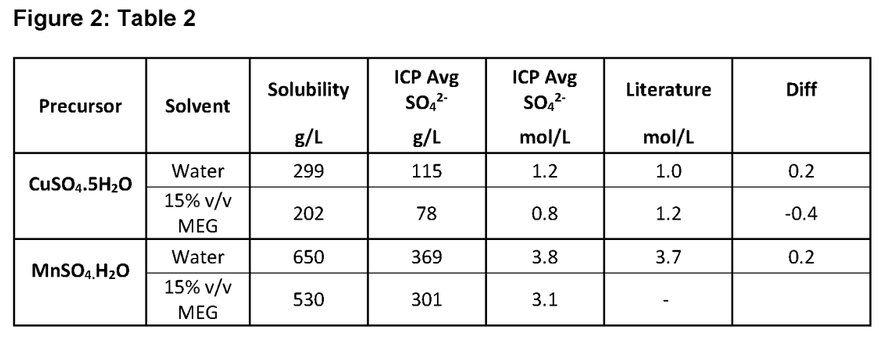
FIG. 2: Table 2: Experimentally observed solubilities for two of the second solution precursors compared with the results in the literature.

The above precursors were tested in separate simplified formulations to verify if the solubilities published in the literature can in fact be realised (Green, 1997; Trimble, 1931). The results in FIG. 1 (Table 1) and FIG. 2 (Table 2) demonstrate this, with very high loadings (solubility >100 g/100 ml) possible. The differences between the observed and literature solubilities are most likely due to different brine compositions and due to the dissolution experiments being conducted over a 24 hour period only without checking if saturation has been attained. The latter was opted for as demonstrating high loadings at limited solubilisation time is sufficient for the purposes of this work.

Figure 3:
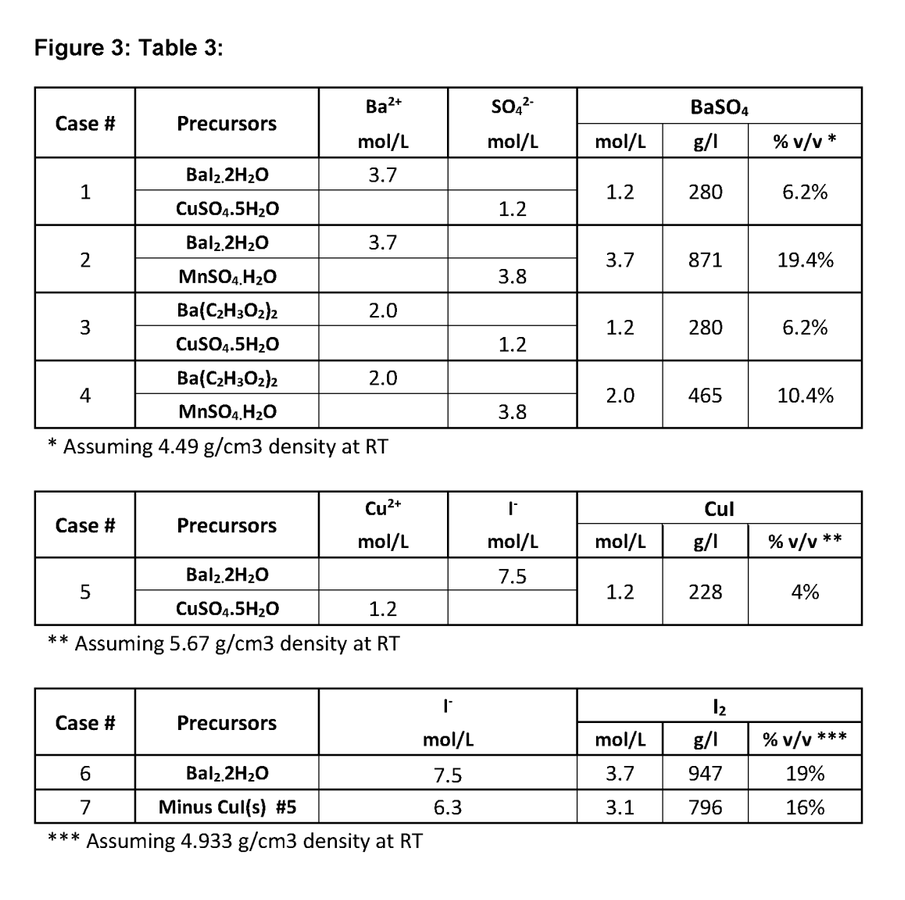
FIG. 3: Table 3: Precipitation levels expected on mass and % v/v basis for few cases.
Figure 4:
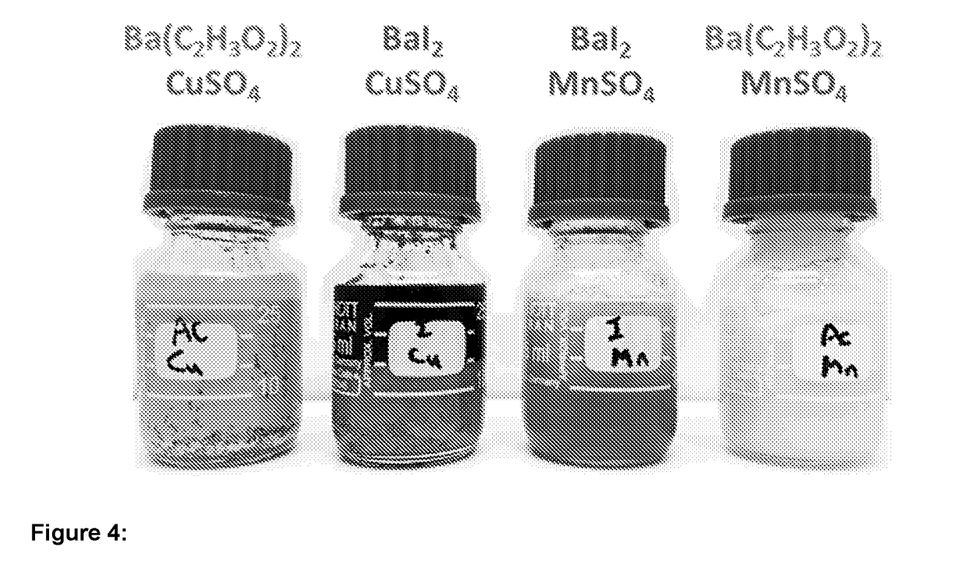
FIG. 4: Test glass bottles after mixing first and second solutions of scale precursors. Precipitation observed from few pairings of the first and second solutions.

When the first and the second solutions were mixed, depending on the reservoir mineralogy, the following reactions were observed:

- $Ba^{2+}_{(aq)} + SO_{4(aq)}^{2-} \rightarrow BaSO_{4(s)}$
- $2I^-_{(aq)} \rightarrow I_{2(s)}$
- $Cu^{2+}_{(aq)} + 6H_2O_{(l)} \rightarrow [Cu(H_2O)_6]^{2+}_{(aq)}$
- $[Cu(H_2O)_6]^{2+}_{(aq)} + 2OH^-_{(aq)} \rightarrow Cu(OH)_{2(s)} + 6H_2O_{(l)}$
- $Cu(OH)_{2(s)} \overset{\Delta}{\rightarrow} CuO_{(s)} + 6H_2O_{(l)}$
- $Cu^{2+}_{(aq)} + CO_{3(aq)}^{2-} + 2OH^-_{(aq)} \rightarrow Cu_2CO_3(OH)_{2(s)}$
- $Cu^{2+}_{(aq)} + 2I^-_{(aq)} \rightarrow CuI_{2(s)}$
- $CuI_{2(s)} \overset{\Delta}{\rightarrow} 2CuI_{(s)} + I_{2(s)}$
- $Mn^{2+}_{(aq)} + 6H_2O_{(l)} \rightarrow [Mn(H_2O)_6]^{2+}_{(aq)}$
- $[Mn(H_2O)_6]^{2+}_{(aq)} + 2OH^-_{(aq)} \rightarrow Mn(OH)_{2(s)} + 6H_2O_{(l)}$
- $Mn(OH)_{2(s)} \overset{\Delta}{\rightarrow} MnO_{(s)} + 6H_2O_{(l)}$
- $Mn^{2+}_{(aq)} + CO_{3(aq)}^{2-} \rightarrow MnCO_{3(s)}$ At saturation (maximum precipitation conditions), few reaction cases were tested based on the experimental results in Table 1 and Table 2. Considering each of the investigated precipitates separately, the precipitation levels and pore volume (injected volume) occupation results are provided in FIG. 3 (Table 3). This demonstrates at least 5% v/v precipitation expected and more likely more than 20% v/v precipitation.

Example 2: Mixing and In-Situ Precipitation

Figure 5:
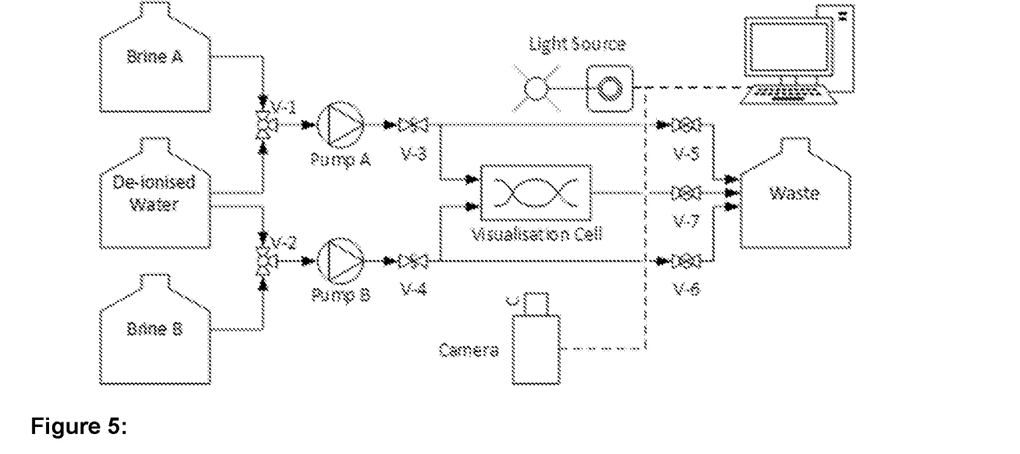
FIG. 5: A schematic of the experimental setup of the visualisation experiment of FIG. 6.
Figure 6:
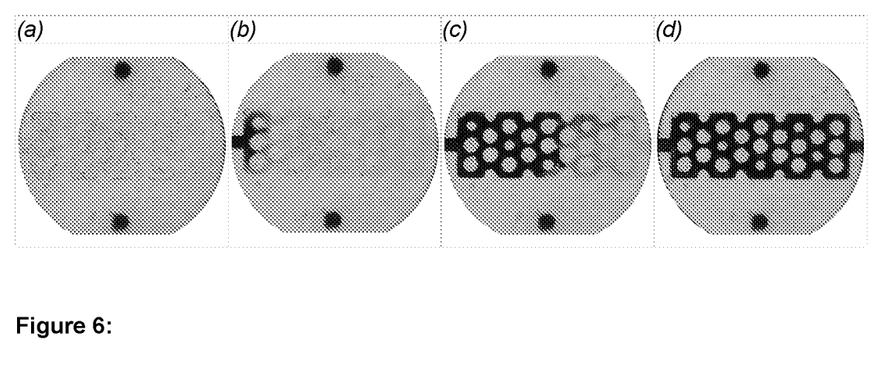
FIG. 6: A micromodel experiment: Placement after barium iodide precursor is injected (first), after copper sulphate precursor was introduced (second), copper sulphate precursor progressed (third), full blockage (fourth). Dark colour is the precipitate blocking light from the light source underneath micromodel. (a) $BI_2$ flooding and pre-flush displacement (b) $CuSO_4$ flooding and initial precipitation (c) Propagation of the mineral precipitation (d) Seal placed in-situ in the porous medium.

Direct observation of in-situ mixing and precipitation was achieved with the aid of flooding experiments in a 3D printed micromodel. A visualisation rig was used to perform the experiment (FIG. 5 and FIG. 6). The micromodel consisted of heterogenous grains at 500 μm or 1000 μm in diameter, with an average porosity of 80% (deliberately high to enable visualising the precipitation and to assess whether blockage is possible at this extreme). The micromodel was initially flooded with a $BaI_2$ solution followed immediately by a $CuSO_4$ solution. The injection was done at a rate of 0.05 ml/min to achieve strongly advective flow (Peclet number, Pe=1885>>10, is a dimensionless number defining the ratio of convective to diffusive flow). The results in FIG. 6 demonstrate:
1) Injection of the solutions separately can achieve the desired in-situ mixing within the pore space, and not only displacement, despite operating in a strongly advective flow regime.
2) The precipitates form immediately on contact between the first and the second solution as per the design of this concept.
3) In roughly 10 seconds, a seal is formed in the entire pore volume of the micromodel. The precipitates formed adhered to the gains and prevented further flow without the need for multiple applications in this case.

Figure 7:
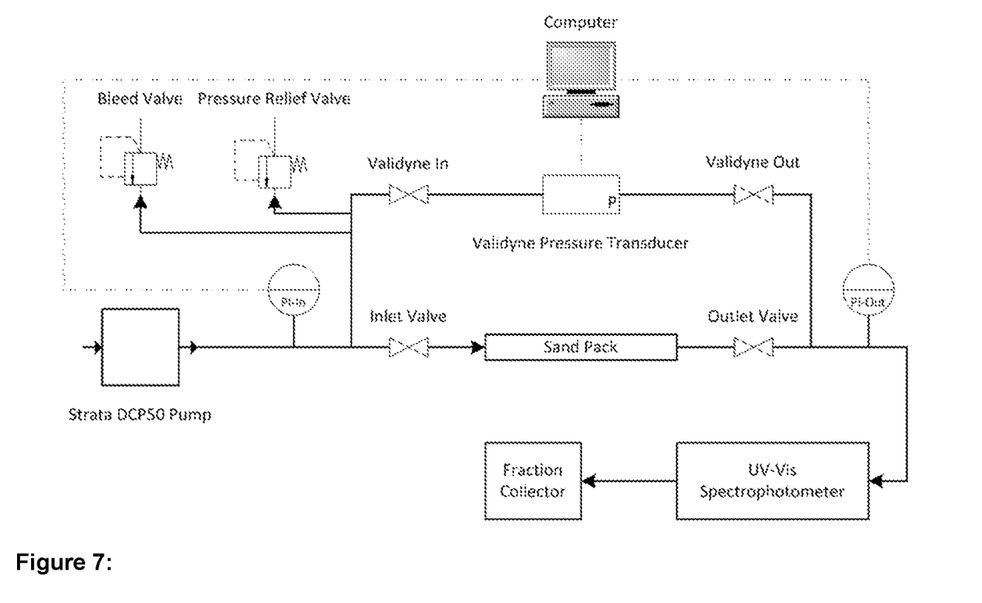
FIG. 7: A schematic of the experimental setup of the sand-pack experiment of FIG. 8.
Figure 8:
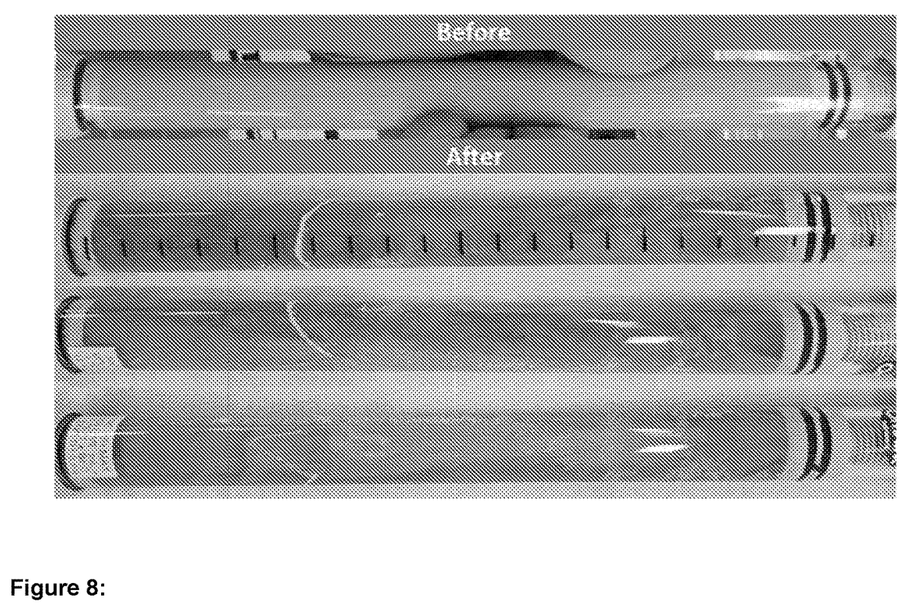
FIG. 8: Sand-pack column before and after (rotated in three positions) the flooding experiment. Co-precipitation is clearly visible (black, white and brown precipitates).

Indirect observation of in-situ mixing and precipitation was also investigated under more representative conditions in a sand-pack experiment. A sand-pack rig was used to perform the experiment (FIG. 7 and FIG. 8). The sand-pack column was packed with fine silica sand with average particle size distribution at 120 μm. The column was 1.5 cm in diameter and 19 cm in length, and once packed, was found to have a porosity around 50% (pore volume—15 ml) and a permeability around 1000 mD. Both conditions represent excellent quality of the porous medium for flow conditions, and hence represent an extreme scenario for attempting an in-situ seal.

In this experiment, two pore volumes of $CuSO_4$ brine was initially used to flood the sand-pack. This was followed by a quarter pore volume of a KCl brine spacer. On injecting $BaI_2$ brine at 150 ml/min, after 0.5 pore volume, all injectivity was lost. The precipitation can be observed in FIG. 8 and appears to consist of multiple precipitates. The findings corroborate the findings from the micromodel experiment.

Example 3: Treatment Design

Figure 9:
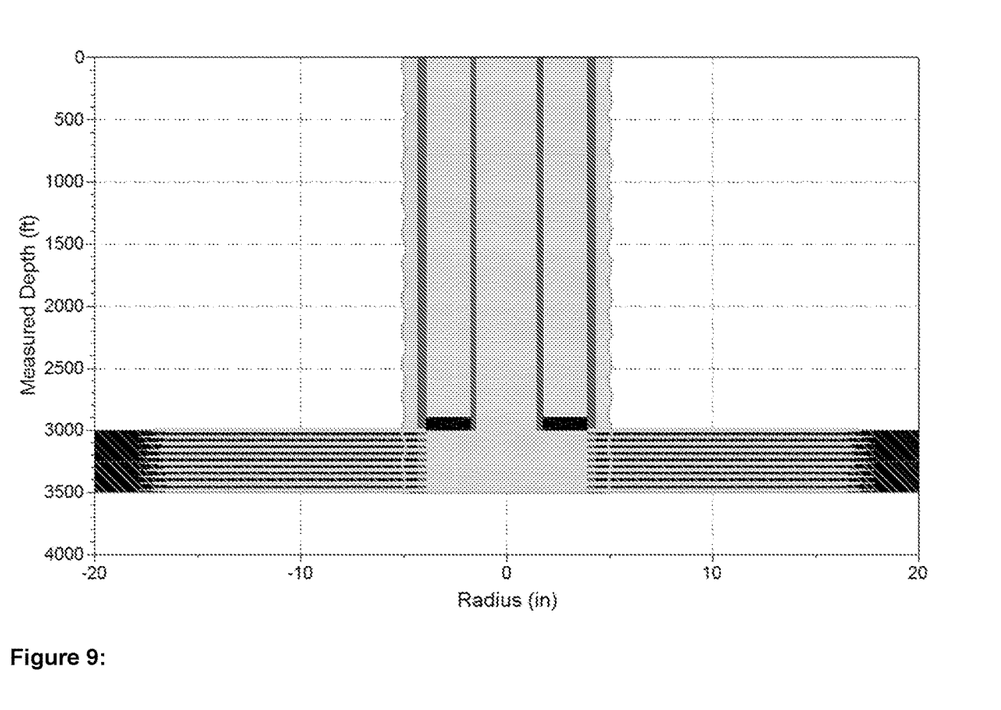
FIG. 9: Perforated oil well requiring a sub-surface isolation.

A key aspect of treatment design on a large-scale will be placement. If the placement is achieved effectively, then the mixing and the precipitation will be enabled more. In this example, a perforated oil well connected to two reservoir layers is considered (FIG. 9). The top layer is more permeable and porous at 300 mD and 25% vs 100 mD and 20% for the bottom layer.

Figure 10:
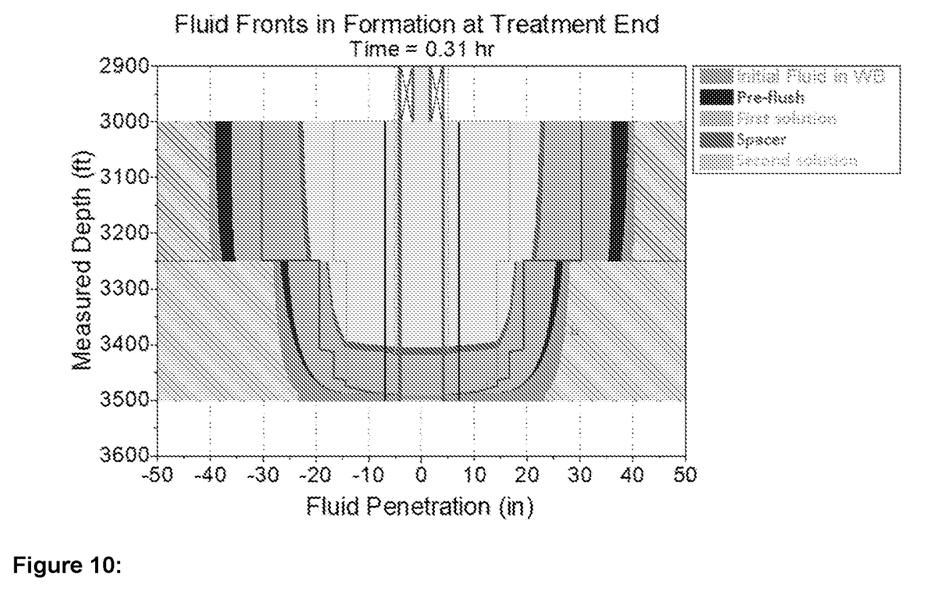
FIG. 10: Fluid fronts at treatment end with good placement.
Figure 11:
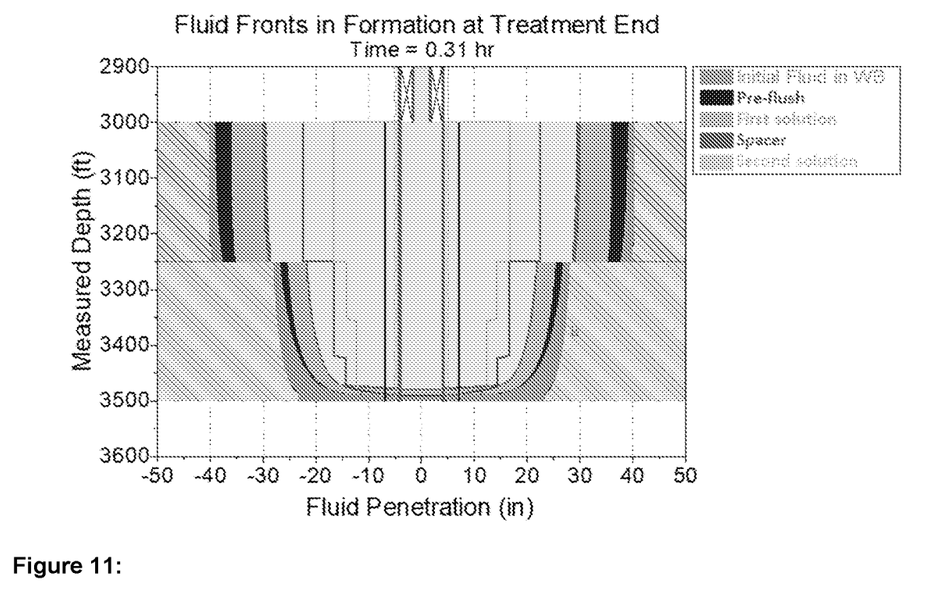
FIG. 11: Fluid fronts at treatment end with inadequate placement.

FIG. 10 demonstrates excellent overlap between the first and second solutions containing the scaling ions which would form the seal. FIG. 11 demonstrates a disconnect in the placement of the first and second solutions in the subsurface, which would not necessarily stop the flow of the reservoir fluids from the bottom reservoir layer, into the top reservoir layer and potentially into the well. Therefore, it is important in assessing the placement to ensure that the reservoir properties are accounted for to ensure a seal covering all flow contributing areas.

Example 4: Modelling the Mixing

A simple reservoir simulation model was developed to test if the mixing of the first and second solutions can be up-scaled. In this exercise, the reservoir was homogeneous, single phase, isothermal, and two dimensional.

Figure 12:
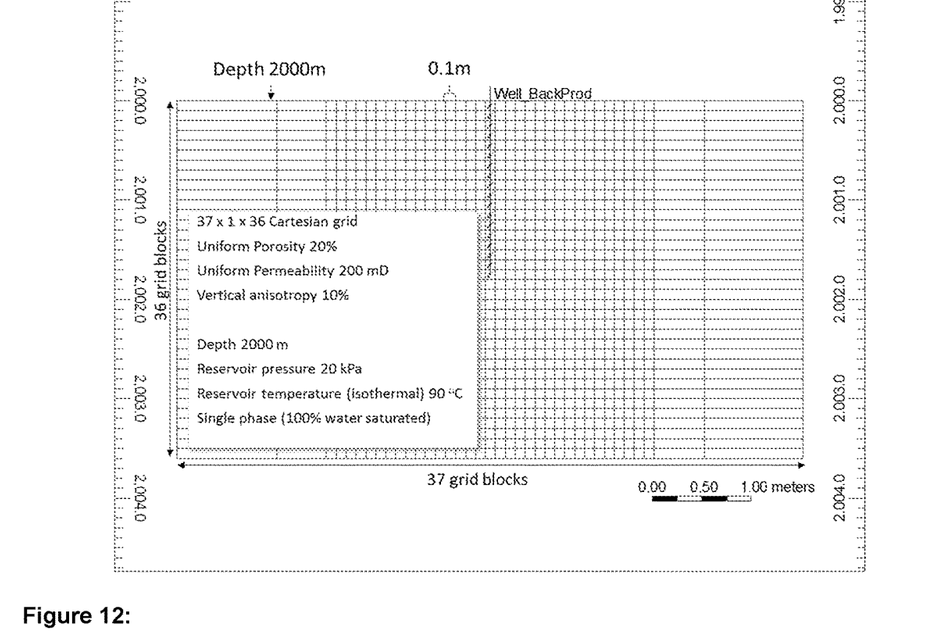
FIG. 12: The parameters of the reservoir model used to investigate subsurface mixing.

Top of the reservoir is at depth of 2,000 m, reservoir pressure is 20 kPa with temperature of 90° C. Dimensions of grid blocks around the wellbore are 0.1×0.1×0.1 m. Porosity and permeability are set as uniform 20% and 200 md, respectively (FIG. 12).

Figure 13:
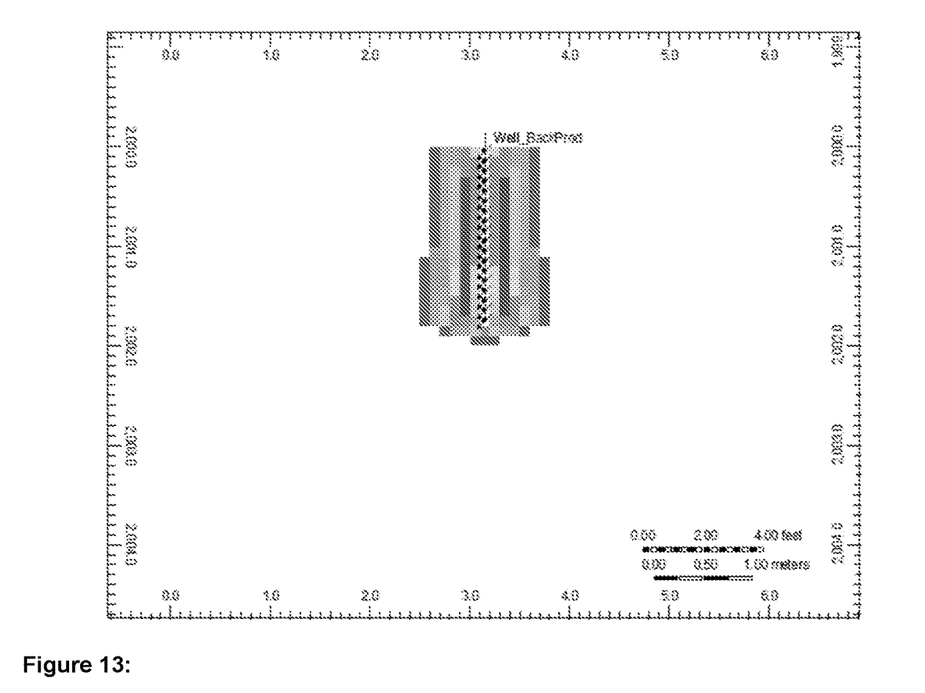
FIG. 13: Mixing in the subsurface (blue=no mixing; red=perfect mixing).

FIG. 13 shows the desired effective mixing around the wellbore as a result of injecting the first and the second solutions separately. The porosity is lost by over 80% in the reservoir model and the injectivity is lost. Access to the well is maintained as demonstrated by the zero mixing within the well itself.

Figure 14:
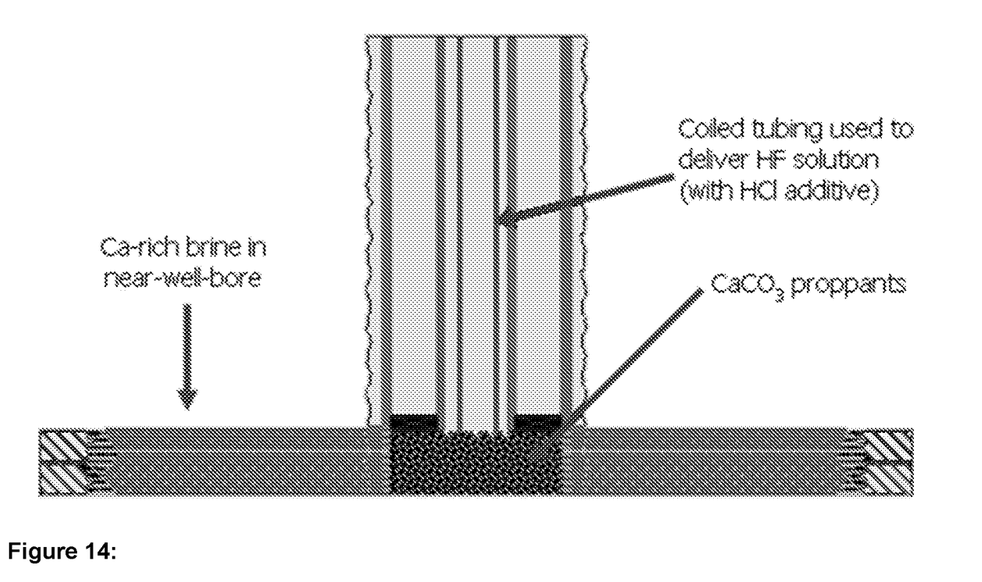
FIG. 14: Use of Cu rich brine, HF and $CaCO_3$ proppants to ensure near-wellbore placement.

Example 5: Proppant and HF Calculations for the Third Embodiment of the Invention This example relates to the third embodiment of the present invention. The methodology is illustrated by the schematic in FIG. 14. The primary reaction driving the near-wellbore seal formation is:

$2Cu_{(aq)}^{2+}$(in the near–wellbore)+$3Ca_{(aq)}^{2+}$(released from the proppants)+$CO_{3(aq)}^{2-}$(released from the proppants)+$4F_{(aq)}^{-}$(delivered by the HF formula)+$SO_{4(aq)}^{2-}$(in the near–wellbore)+$2OH_{(aq)}^{-}$(from buffer in the second solution) →$2CaF_{2(s)}$+$CaSO_{4(s)}$+$Cu_2CO_3(OH)_{2(s)}$

The calculations below assumed that only calcium fluoride will precipitate, and represent a small-scale test of the reaction:

The solubility of $CaF_2$ in hot water is 0.0017 g/100 ml and its density is 3.18 g/cm³. Fully utilised 1 kg of proppant yielded:
1.00 kg of $CaCO_3$ proppant gave 9.99 mol $Ca^{2+}$;
9.99 mol $Ca^{2+}$ fully reacted with $F^-$ gave 0.78 kg $CaF_2$;
0.78 kg $CaF_2$ occupied 245.29 cm³ of free pore-space.

Considering a 7 inch (17.78 cm) hole over the 1 m length of reservoir section, the pore-space reduction per kg of proppant is:

$$\text{Pore space to plug} = \left(\text{cylindrical volume of plug as } \frac{\pi}{4}(\text{Plug Diameter}^2 - \text{Bore Diameter}^2) \times \text{length}\right) \times \text{porosity}$$

Assuming plug depth in the near-wellbore at least 15 cm and rock with 20% porosity:

$$\text{Volume to plug} = \frac{\pi}{4} \times ((17.78 + 15)^2 - 17.78^2) \times 100 \times 0.2 = 11,912.92 \text{ cm}^3 \text{ per meter of length;}$$

Pore-space reduction per kg of proppant per meter of reservoir section can be estimated from the 245.29 cm³ that $CaF_2$ precipitate occupies divided by the total pore volume of 11,912.92 cm³. It gives 2.06% pore space reduction form 1 kg of proppant per meter length.

Thus, following the above small-scale test calculations, which assumes that $CaF_2$ is all the calcium comes from the proppant only, and $CaF_2$ to be the only plug forming precipitate, only total of 48.57 kg/m of proppant is required to be injected downhole to create a plug that depth of 15 cm. In practice, a lot less would be required due to the calcium-rich brine in the near-wellbore and the co-precipitation of other co-precipitates as well as precipitates from solids in (from side reactions depending on reservoir fluids/mineralogy e.g. potassium silicofluoride, hydrous silica and calcium fluoride hydrous aluminosilicate). Also, in practice, 100% plugging is not required to destroy the flowing potential of the well.

In a worst-case scenario estimate, volumes of 3% HF required will be:
  48.57 kg/m proppant requires 485.24 mol/m HF for full conversion;
  485.24 mol/m HF is 9.71 kg/m HF;
  At 3% w/v HF acid solution (3 g/100 ml, or 30 g/L), this translates to 323.66 L/m or 2.04 bbl/m of solution per meter length of reservoir section.

Preferred compositions, features and embodiments of each aspect of the invention are as for each of the other aspects mutatis mutandis unless context demands otherwise.

Each document, reference, patent application or patent cited in this text is expressly incorporated herein in their entirety by reference, which means it should be read and considered by the reader as part of this text. That the document, reference, patent application or patent cited in the text is not repeated in this text is merely for reasons of conciseness.

Reference to cited material or information contained in the text should not be understood as a concession that the material or information was part of the common general knowledge or was known in any country.

Although the invention has been particularly shown and described with reference to particular examples, it will be understood by those skilled in the art that various changes in the form and details may be made therein without departing from the scope of the present invention.

REFERENCES

Green, D. W., and J. O. Maloney. "Perry's chemical engineers' handbook." *McGraw-Hill* (1997).
Gdanski, R. D. (1994, November 1). Fluosilicate Solubilities Affect HF Acid Compositions. Society of Petroleum Engineers. doi:10.2118/27404-PA
Shuchart, C. E. (1995, January 1). HF Acidizing Returns Analyses Provide Understanding of HF Reactions. Society of Petroleum Engineers. doi:10.2118/30099-MS
Shuchart, C. E., & Ali, S. A. (1993, November 1). Identification of Aluminum Scale With the Aid of Synthetically Produced Basic Aluminum Fluoride Complexes. Society of Petroleum Engineers. doi:10.2118/23812-PA
Trimble, H. M. "Solubilities of salts in ethylene glycol and in its mixtures with water." *Industrial & Engineering Chemistry* 23, no. 2 (1931): 165-167.

The invention claimed is:

1. A method of reducing the porosity of porous media of a near-wellbore wherein the method comprises:
  a) applying a first solution comprising a first and second scale precursor in the form of soluble ions to the porous media;
  b) applying a second solution comprising a third and fourth scale precursor in the form of soluble ions to the porous media;
  wherein following steps a) and b), at least a portion of the scale precursors form at least two co-precipitated insoluble salts, and
  wherein the at least two co-precipitated insoluble salts comprise a first insoluble salt comprising the first and fourth scale precursor and a second insoluble salt comprising the second and third scale precursor.

2. The method of claim 1 wherein the method further comprises repeating steps a) and b).

3. The method of claim 1 where following one or more applications of steps a) and b), the egress of fluids from the porous medium of the near-wellbore and their inflow into the well is reduced or stopped.

4. The method of claim 1, wherein the method further comprises applying either or both of a cement plug or a mechanical plug to the wellbore.

5. The method of claim 1, wherein the first and second solutions are miscible.

6. The method of claim 5 wherein the steps a) and b) are performed consecutively, wherein the method further comprises applying a spacer solution or spacer device to the porous media between steps a) and b).

7. The method of claim 6 wherein either:
  a) the spacer solution has the same miscibility as the first and second solutions, or;
  b) the spacer solution is not miscible with the first solution, but the miscibility of the spacer solution within the first solution improves on mixing with the second solution.

8. The method of claim 1, where the steps a) and b) are performed consecutively or concurrently.

9. The method of claim 1, wherein the second solution is prepared in situ using an acidic brine solution in combination with solids present in the wellbore.

10. The method of claim 1, wherein the method further comprises applying a pre-flush solution to the porous media, wherein the pre-flush solution comprises an amphiphile, a surfactant or a combination thereof.

11. The method of claim 1, wherein either or both of the first or second solutions are non-aqueous.

12. The method of claim 11 wherein the non-aqueous solution or solutions comprises a glycol ether amphiphile.

13. The method of claim 12, wherein the glycol ether amphiphile comprises one or more selected from a group consisting of ethylene glycol, ethylene glycol monobutyl ether and diethylene glycol monobutyl ether.

14. The method of claim 1 wherein either or both of the first or second solutions are aqueous.

15. The method of claim 13 wherein the aqueous solution or solutions comprises seawater, produced water, KCl brine or low salinity brine.

16. The method of claim 1 wherein the first and second scale precursors are selected from a group consisting of:
  a) cations selected from:
    i. group 2 alkali earth metals optionally $Ca^{2+}$, $Sr^{2+}$, and $Ba^{2+}$, or;
    ii. polyatomic cations, optionally $NH^{4+}$, and;
  b) anions selected from:
    i. the halides group optionally $F^-$, $Cl^-$, $Br^-$ or $I^-$,
    ii. an oxide anion or;
    iii. a polyatomic anion, optionally $CH_3COO^-$, $CO_3^{2-}$, or a hydroxide anion.

17. The method of claim 16 wherein the first solution further comprises cations and/or anions selected from a group consisting of the following, besides the first and second scale precursors:
  a) cations selected from:
    i. group 2 alkali earth metals optionally $Ca^{2+}$, $Sr^{2+}$, and $Ba^{2+}$, or;
    ii. polyatomic cations, optionally $NH^{4+}$, and;
  b) anions selected from:
    i. the halides group optionally $F^-$, $Cl^-$, $Br^-$ or $I^-$,
    ii. an oxide anion or;
    iii. a polyatomic anion, optionally $CH_3COO^-$, $CO_3^{2-}$, or a hydroxide anion.

18. The method of claim 1 wherein the third and fourth scale precursors are different from the first and second scale precursors and are selected from a group consisting of the following:
  a) cations selected from the transition metal group, optionally a cation selected from the $5^{th}$ period transition metal group, further optionally $Mn^{2+}$ or $Cu^{2+}$, and;
  b) a polyatomic anion, optionally $SO_4^{2-}$.

19. The method of claim 18 wherein the second solution further comprises cations and/or anions selected from a group consisting of the following, besides the third and fourth scale precursors:
  a) cations selected from the transition metal group, optionally a cation selected from the $5^{th}$ period transition metal group, further optionally $Mn^{2+}$ or $Cu^{2+}$, and;
  b) a polyatomic anion, optionally $SO_4^{2-}$.

20. The method of claim 1 wherein the at least two insoluble salts are selected from a group consisting of:
  a) a group 2 metal sulphate optionally $BaSO_4$, $SrSO_4$ or $CaSO_4$, and;
  b) a transition metal salt of halide, oxide, hydroxide optionally $CuI$, $CuI_2$, $Cu(OH)_2$, $CuBr_2$, $Cu(CH_3COO)_2$, $MnI_2$, $Mn(OH)_2$, $MnBr_2$, $Cu_2O$, $CuO$, $MnO$, $Mn_3O_4$, $Mn_2O_3$, $MnO_2$, $Cu_2CO_3(OH)_2$, or $MnCO_3$.

21. The method of claim 1 wherein one or more of the scale precursors are provided at concentrations greater than 100 g/100 ml.

22. The method of claim 1 wherein either or both of the first or second solutions comprise an amphiphilic solvent.

23. The method of claim 22 wherein the amphiphilic solvent is monoethylene glycol.

24. The method of claim 1, wherein:
  a) the first solution comprises barium iodide ($BaI_2$) and barium acetate ($Ba(CH_3COO)_2$) as the first, second and other scale precursors, 15% ethylene glycol (MEG) and sulphate-free seawater,
  b) the second solution comprises copper sulphate ($CuSO_4$) and manganese sulphate ($MnSO_4$) as the third, fourth and other scale precursors, 15% ethylene glycol MEG and seawater, and;
  the method further comprises:
  I. applying a pre-flush solution comprising 15% ethylene glycol monobutyl ether (EGMBE) in sulphate-free seawater to the porous media,
  II. applying a spacer solution comprising sulphate-free seawater to the porous media, prior to the application of the second solution,
  III. repeating steps a) and b) as required until the egress of fluids from the porous medium of the near-wellbore and their inflow into the well is reduced or stopped.

25. The method of claim 1, wherein:
the method further comprises:
  I. applying calcium carbonate solids to an open hole area and perforations in the porous media, either part of the way or all the way to top perforations,
  II. applying a spacer solution comprising sulphate-free seawater to the porous media, prior to the application of the second solution,
  III. applying hydrofluoric acid to the porous media, optionally doped with concentrations of hydrochloric acid,
  IV. repeating steps a) and b) as required until egress of fluids from the porous media of the near-wellbore and their inflow into the well is reduced or stopped, and; wherein;
  a) the first solution comprises a copper-containing brine, optionally $CuSO_4$ as the first and second scale precursors, optionally further comprising a buffer,
  b) the second solution is created in situ by a reaction between the hydrofluoric acid and the calcium carbonate solids, to form the third and fourth scale precursor.

26. At least two co-precipitated insoluble salts in a near wellbore region, where the two salts are formed from a kit comprising:
  a) A first solution comprising a first and second scale precursor in the form of soluble ions, and
  b) A second solution comprising a third and fourth scale precursor in the form of soluble ions;
  wherein the first and second solutions are configured such that when they combine, at least a portion of the scale precursors form at least two co-precipitated insoluble salts, and
  wherein the at least two co-precipitated insoluble salts comprise a first insoluble salt comprising the first and fourth scale precursor and a second insoluble salt comprising the second and third scale precursor.

* * * * *